(12) United States Patent
Takehana

(10) Patent No.: US 10,146,109 B2
(45) Date of Patent: Dec. 4, 2018

(54) PROJECTION SYSTEM AND PROJECTOR

(71) Applicant: SEIKO EPSON CORPORATION, Tokyo (JP)

(72) Inventor: Naoto Takehana, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 236 days.

(21) Appl. No.: 15/178,027

(22) Filed: Jun. 9, 2016

(65) Prior Publication Data
US 2016/0370691 A1 Dec. 22, 2016

(30) Foreign Application Priority Data

Jun. 22, 2015 (JP) ................................ 2015-124488

(51) Int. Cl.
| | |
|---|---|
| G03B 21/14 | (2006.01) |
| G02B 13/16 | (2006.01) |
| G02B 13/04 | (2006.01) |
| G02B 7/04 | (2006.01) |
| G03B 21/28 | (2006.01) |
| G02B 17/08 | (2006.01) |
| G03B 21/00 | (2006.01) |

(52) U.S. Cl.
CPC ............. *G03B 21/142* (2013.01); *G02B 7/04* (2013.01); *G02B 13/04* (2013.01); *G02B 13/16* (2013.01); *G02B 17/08* (2013.01); *G03B 21/28* (2013.01); *G03B 21/005* (2013.01)

(58) Field of Classification Search
CPC .... G03B 21/142; G03B 21/28; G03B 21/005; G02B 7/04; G02B 13/16
USPC .......................................................... 353/101
See application file for complete search history.

(56) References Cited

U.S. PATENT DOCUMENTS 7,471,464 B2 * 12/2008 Kageyama ............... G02B 7/04
359/699

FOREIGN PATENT DOCUMENTS

JP 2011-085922 A 4/2011

\* cited by examiner

*Primary Examiner* — Steven H Whitesell Gordon
*Assistant Examiner* — Jerry Brooks
(74) *Attorney, Agent, or Firm* — Oliff PLC

(57) ABSTRACT

A feeding mechanism is used to adjust the distance between a reduction side lens group and an object plane for back focus adjustment. A rotation angle adjustment mechanism capable of rotating action independent of rotating action performed in the back focus adjustment is used to adjust the rotation angle by which at least part of the reduction side lens group is rotated.

16 Claims, 12 Drawing Sheets

PROJECTION SYSTEM AND PROJECTOR

BACKGROUND

1. Technical Field

The present invention relates to a projection system suitable to be incorporated into a projector that enlarges and projects an image on an image display device and further relates to a projector.

2. Related Art

As a projector and a projection system suitable to be incorporated into a projector, for example, there is a known projector and projection system that use a fixed lens section, a movable lens section, and a concave mirror to reduce inclination of an oblique light flux in oblique projection with respect to the optical axis in order to perform wide-angle projection over a short distance (short-throw projection) while effectively preventing an image-forming light flux from being truncated by a lens barrel (see JP-A-2011-85922).

In general, in a projector, to prevent the screen-side image plane from inclining due to variation in back focal distance (distance from panel surface to projection system), it is important to perform precise back focus adjustment. In particular, in short-throw projection, in which the image plane tends to greatly incline, it is important to perform back focus adjustment by adjustment of the position of a fixed-lens-section-side lens group including a rear lens of the projection system. In the back focus adjustment, rotary adjustment using, for example, a helicoid screw is typically employed, and the back focus adjustment is performed by rotation of the fixed lens section.

On the other hand, centering each lens is also important work because how well the centering is performed affects optical performance. In particular, centering an aspheric lens is very important work because how well the aspheric lens is centered greatly affects the optical performance.

In a projection system for a projector, a demand for high resolution and other factors force employment of an aspheric lens in some cases. In recent years, an aspheric lens is employed not only in a typical projector but also in a short-throw type projector, and it is also conceivable that in the projection system that forms part of a short-throw type projector, an aspheric lens is employed, for example, not only in a movable lens section but also in a fixed lens section, that is, a lens section used to perform back focus adjustment.

However, to perform the back focus adjustment by rotation of the fixed lens section as described above, when the rotating action is performed, it is not always easy to perform the centering in the fixed lens section along with the back focus adjustment.

SUMMARY

An advantage of some aspects of the invention is to provide a projection system used in a projector and readily allowing back focus adjustment and centering and further provide a projector using the projection system.

A projection system according to an aspect of the invention includes a reduction side lens group provided on a side where highest demagnification is achieved, a feeding mechanism that performs rotary feeding action to adjust a distance between the reduction side lens group and an object plane, and a rotation angle adjustment mechanism that is combined with the feeding mechanism and performs rotating action independent of the rotary feeding action to adjust a rotation angle by which at least part of the reduction side lens group is rotated.

In the optical system described above, the feeding mechanism can adjust the distance between the reduction side lens group and the object surface for the back focus adjustment. Further, the rotation angle adjustment mechanism, which is independent of the rotating action performed in the back focus adjustment, can adjust the rotation angle by which at least part of the reduction side lens group is rotated. That is, both the back focus adjustment and the centering can be readily performed.

According to a specific aspect of the invention, the rotation angle adjustment mechanism adjusts the rotation angle with the distance between the reduction side lens group and the object plane maintained. In this case, the action of the rotation angle adjustment mechanism does not affect the back focus adjustment.

According to another specific aspect of the invention, the projection system further includes the following components sequentially arranged from the reduction side: a fixed lens group including the reduction side lens group and fixed in an optical axis direction in focusing operation; a movable lens group allowed to move in the optical axis direction in the focusing operation; and an aspheric mirror having a reflection surface having a concave aspheric shape. In this case, for example, an optical system suitable for short-throw projection can be configured.

According to another specific aspect of the invention, the reduction side lens group includes an aspheric lens, and the rotation angle adjustment mechanism adjusts at least a rotation angle by which the aspheric lens is rotated. In this case, provision of the aspheric lens allows an increase in resolution, distortion correction, and other advantages, and the adjustment of the rotation angle of the aspheric lens allows optical performance of the aspheric lens to be maintained.

According to another specific aspect of the invention, the feeding mechanism and the rotation angle adjustment mechanism are configured by using a double frame structure including an outer frame and an inner frame for accommodating lenses. In this case, the double frame structure allows the back focus adjustment performed by the rotary feeding action of the feeding mechanism and the centering performed by the rotating action of the rotation angle adjustment mechanism to be readily and reliably performed.

According to another specific aspect of the invention, the rotation angle adjustment mechanism is biased by a biasing member toward the feeding mechanism and rotatably combined with the feeding mechanism. In this case, the biasing force produced by the biasing member can be used to combine the rotation angle adjustment mechanism with the feeding mechanism and maintain the rotating action of the rotation angle adjustment mechanism. Further, for example, when the back focus adjustment needs to be performed again, the rotation angle can be adjusted again by the rotation angle adjustment mechanism.

According to another specific aspect of the invention, the biasing member is a spring piece attached to a flange section formed at a feeding-direction-side end surface of the feeding mechanism, and the rotation angle adjustment mechanism is rotatably disposed while pressed with the spring piece toward the feeding mechanism. In this case, the spring piece can combine the rotation angle adjustment mechanism with the feeding mechanism and maintain the rotating action of the rotation angle adjustment mechanism.

According to another specific aspect of the invention, the rotation angle adjustment mechanism is fixed to the feeding mechanism by using a fixing member. In this case, the rotation angle is unlikely to change after the adjustment, whereby no readjustment is required.

A projector according to another aspect of the invention includes a light modulator that modulates light from a light source to form image light and any of the projection systems described above that projects the image light from the light modulator. In this case, providing any of the projection systems described above allows the back focus adjustment and the centering to be readily performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projection system according to an embodiment of the invention will be described below in detail with reference to the drawings.

Figure 1:
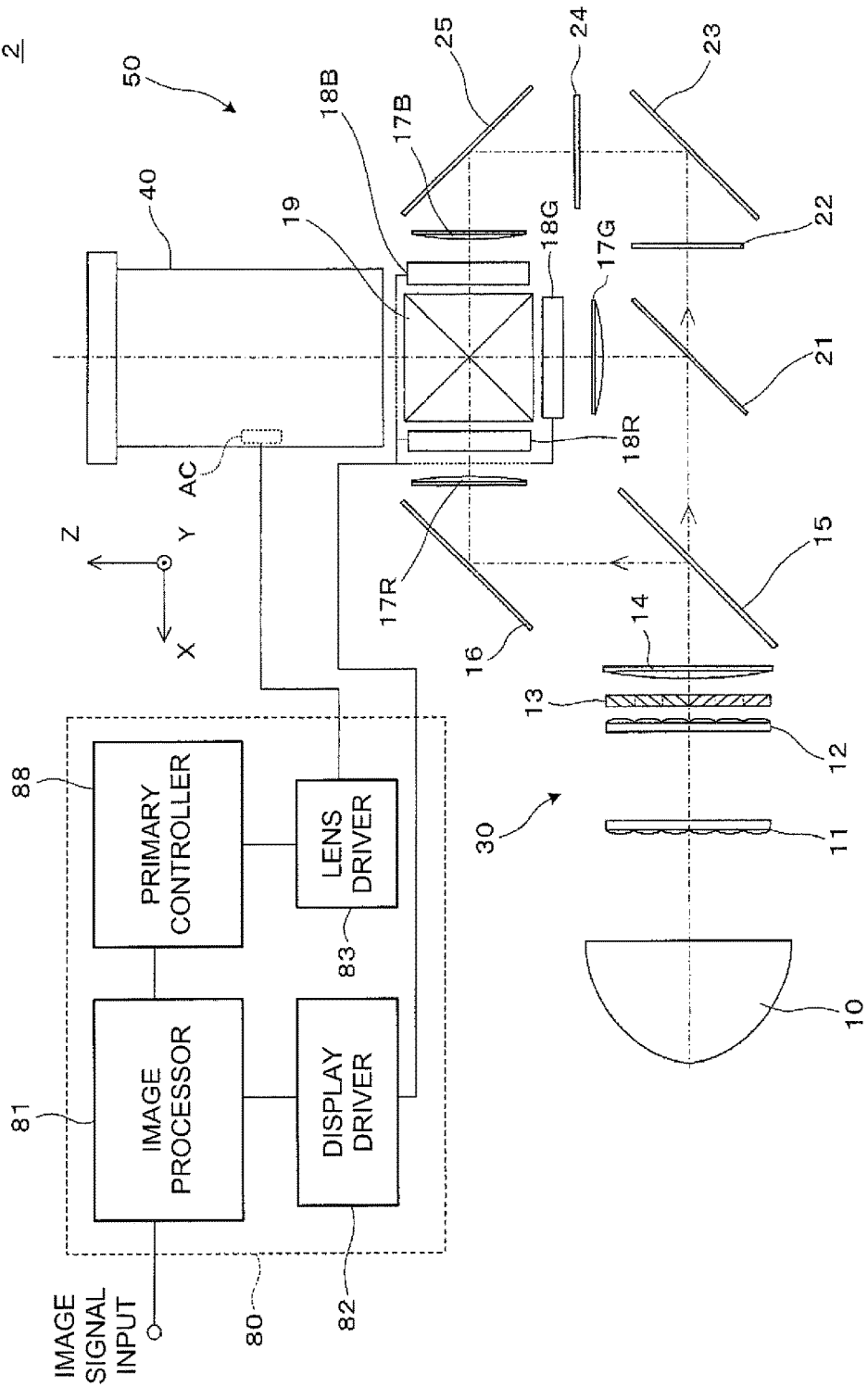
FIG. 1 shows a schematic configuration of a projector in which a projection system according to an embodiment is incorporated.

A projector 2, in which the projection system according to the embodiment of the invention is incorporated, includes an optical system section 50, which projects image light, and a circuit apparatus 80, which controls the action of the optical system section 50, as shown in FIG. 1.

In the optical system section 50, a light source 10 is, for example, an ultrahigh-pressure mercury lamp and emits light containing R light, G light, and B light. The light source 10 may be another discharge-type light source different from an ultrahigh-pressure mercury lamp or a solid-state light source, such as an LED and a laser. Each of a first optical integration lens 11 and a second optical integration lens 12 has a plurality of lens elements arranged in an array. The first optical integration lens 11 divides the light flux from the light source 10 into a plurality of light fluxes. Each of the lens elements of the first optical integration lens 11 focuses the light flux from the light source 10 in a position in the vicinity of the corresponding lens element of the second optical integration lens 12. The lens elements of the second optical integration lens 12 cooperate with a superimposing lens 14 to form images of the lens elements of the first optical integration lens 11 on liquid crystal panels 18R, 18G, and 18B. The configuration described above allows entire display areas of the liquid crystal panels 18R, 18G, and 18B to be so illuminated with the light from the light source 10 that the brightness across the display areas is roughly uniform.

A polarization conversion element 13 converts the light from the second optical integration lens 12 into predetermined linearly polarized light. The superimposing lens 14 superimposes the images of the lens elements of the first optical integration lens 11, which are formed via the second optical integration lens 12, on one another on the display areas of the liquid crystal panels 18R, 18G, and 18B.

A first dichroic mirror 15 reflects the R light incident through the superimposing lens 14 and transmits the G light and the B light incident therethrough. The R light reflected off the first dichroic mirror 15 travels via a reflection mirror 16 and a field lens 17R and impinges on the liquid crystal panel 18R, which is a light modulator. The liquid crystal panel 18R modulates the R light in accordance with an image signal to form an R image.

A second dichroic mirror 21 reflects the G light through the first dichroic mirror 15 and transmits the B light therethrough. The G light reflected off the second dichroic mirror 21 travels through a field lens 17G and impinges on the liquid crystal panel 18G, which is a light modulator. The liquid crystal panel 18G modulates the G light in accordance with an image signal to form a G image. The B light having passed through the second dichroic mirror 21 travels via relay lenses 22 and 24, reflection mirrors 23 and 25, and a field lens 17B and impinges on the liquid crystal panel 18B, which is a light modulator. The liquid crystal panel 18B modulates the B light in accordance with an image signal to form a B image.

A cross dichroic prism 19 is a light combining prism, combines the R image, the G image, and the B image formed by the liquid crystal panels 18R, 18G, and 18B with one another to form image light, and directs the image light toward a projection system 40.

The projection system 40 is a projection zoom lens that enlarges the image light formed by the cross dichroic prism 19 and projects the enlarged image light on a screen that is not shown.

The circuit apparatus 80 includes an image processor 81, to which an external image signal, such as a video signal, is inputted, a display driver 82, which drives the liquid crystal panels 18R, 18G, and 18B provided in the optical system section 50 on the basis of an output from the image processor 81, a lens driver 83, which causes a drive mechanism (not shown) provided in the projection system 40 to operate to adjust the state of the projection system 40, and a primary controller 88, which oversees and controls the action of each of the circuit sections 81, 82, and 83.

The image processor 81 converts the inputted external image signal into images signals containing grayscales and other factors of the three colors. The image processor 81 can further perform a variety of types of image processing, such as distortion correction and color correction, on the external image signal.

The display driver 82 can cause the liquid crystal panels 18R, 18G, and 18B to operate on the basis of the image signals outputted from the image processor 81 so as to cause the liquid crystal panels 18R, 18G, and 18B to form images corresponding to the image signals or images corresponding to the image signals on which image processing has been performed.

The lens driver 83 operates under the control of the primary controller 88 and causes an actuator AC to move, as appropriate, part of optical elements that form the projection system 40 along an optical axis OA. The lens driver 83 can thus bring the images projected through the projection system 40 on the screen into focus when the projection distance is changed. The lens driver 83 can further change the vertical position of the images projected on the screen by performing tilt adjustment in which the entire projection system 40 is moved in an upward or downward direction perpendicular to the optical axis OA.

Figure 2A:
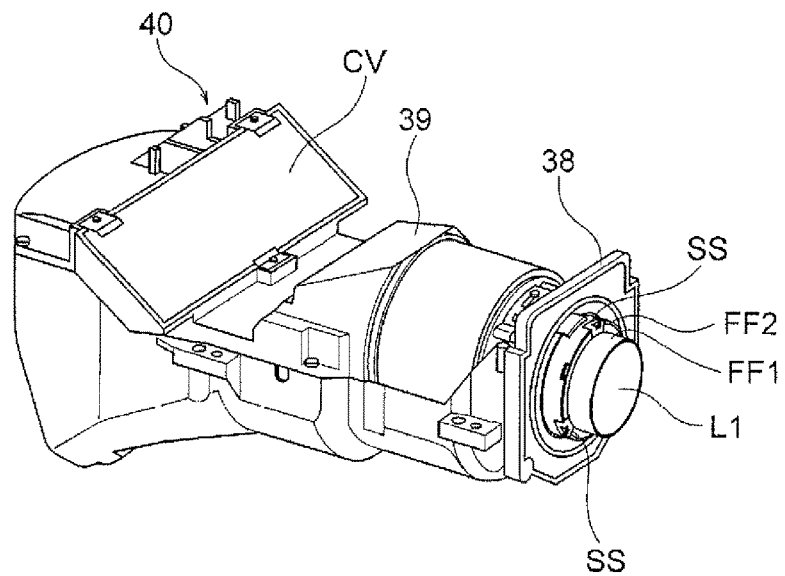
FIG. 2A is a perspective drawing showing an example of the projection system.

The structure of the projection system 40 according to the embodiment will be specifically described below with reference to FIGS. 2A and 2B and other figures. It is noted that the projection system 40 shown in FIGS. 2A and 2B and other figures by way of example and the projection system 40 in an example that will be described later (see FIGS. 7 and 8) have the same configuration.

The projection system 40 includes not only an optical system section (primary section that provides optical effect) formed of a plurality of refractive lenses and a mirror but also a lens barrel section 39, which is formed of a plurality of cylindrical frame structures for accommodating the lenses and other optical members, an attachment section 38 to be attached to a body section of the projector 2 (see FIG. 1), and a light transmissive cover member CV for protecting the lenses and mirrors, as shown in FIGS. 2A, 2B, 3, and 4.

Figure 2B:
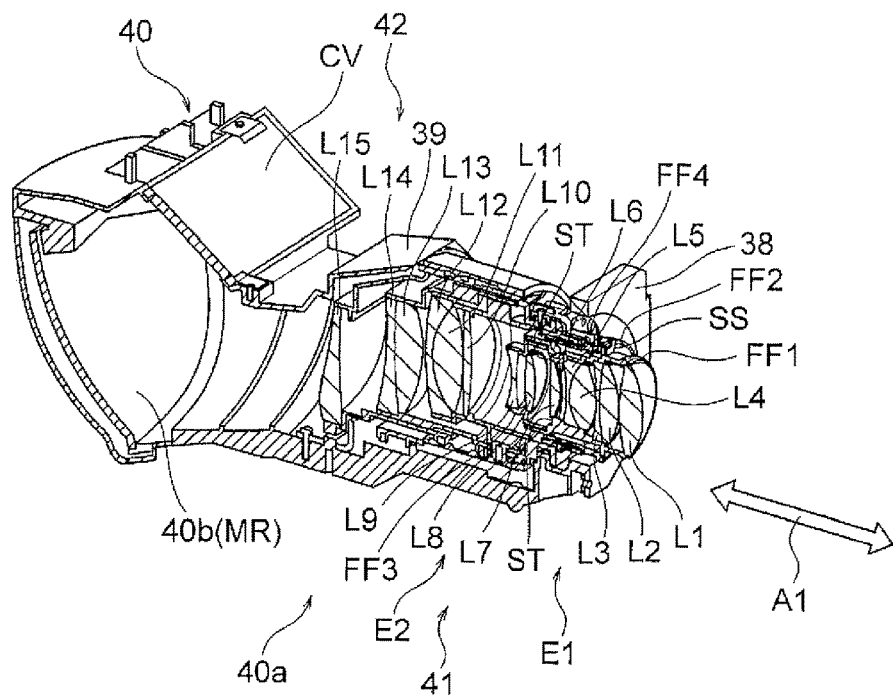
FIG. 2B is a perspective cross-sectional drawing.

The optical system section of the projection system 40 is formed of the following optical groups sequentially arranged from the reduction side: a first optical group 40a, which is formed of a plurality of lenses and has positive power; and a second optical group 40b, which is formed of a mirror MR (aspheric mirror) having a single reflection surface having a concave aspheric shape, as shown, for example, in FIG. 2B. The first optical group 40a is formed of lenses L1 to L15, which form a first-first lens group 41 (lenses L1 to L9) having positive power and a first-second lens group 42 (lenses L10 to L15) having positive power. The first-first lens group 41 is a fixed lens group fixed in the optical axis direction (direction A1 in FIG. 2B) during focusing operation performed when the projection distance is changed. It can be said that the first-first lens group 41 is, out of the lens groups that forms the projection system 40, a reduction side lens group provided on the side where the highest demagnification is achieved. The first-second lens group 42 is a movable lens group that can move in the optical axis direction during the focusing operation.

The first-first lens group 41 is formed of a lens group E1 (lenses L1 to L7), which is disposed closer to the reduction side than an aperture stop ST, and a lens group E2 (lenses L8 and L9), which is disposed closer to the enlargement side than the aperture stop ST.

The lens barrel section 39 accommodates the first-first lens group 41. The lens barrel section 39 has a double frame structure including a first frame FF1 and a second frame FF2. The second frame FF2 is located outside the first frame FF1, and the first frame FF1 is fit into the second frame FF2.

The first frame FF1 accommodates the lens group E1. In other words, in the lens barrel section 39, the first frame FF1, which is a relatively inner frame, is accommodated in the second frame FF2, which is a relatively outer frame. The lens barrel section 39 further includes a third frame FF3, which accommodates the lens group E2 and is bonded to the first frame FF1, and a fourth frame FF4, which is located outside the second frame FF2 and connected to the attachment section 38 to form, along with the second frame FF2, a helicoid structure HE.

Figure 3:
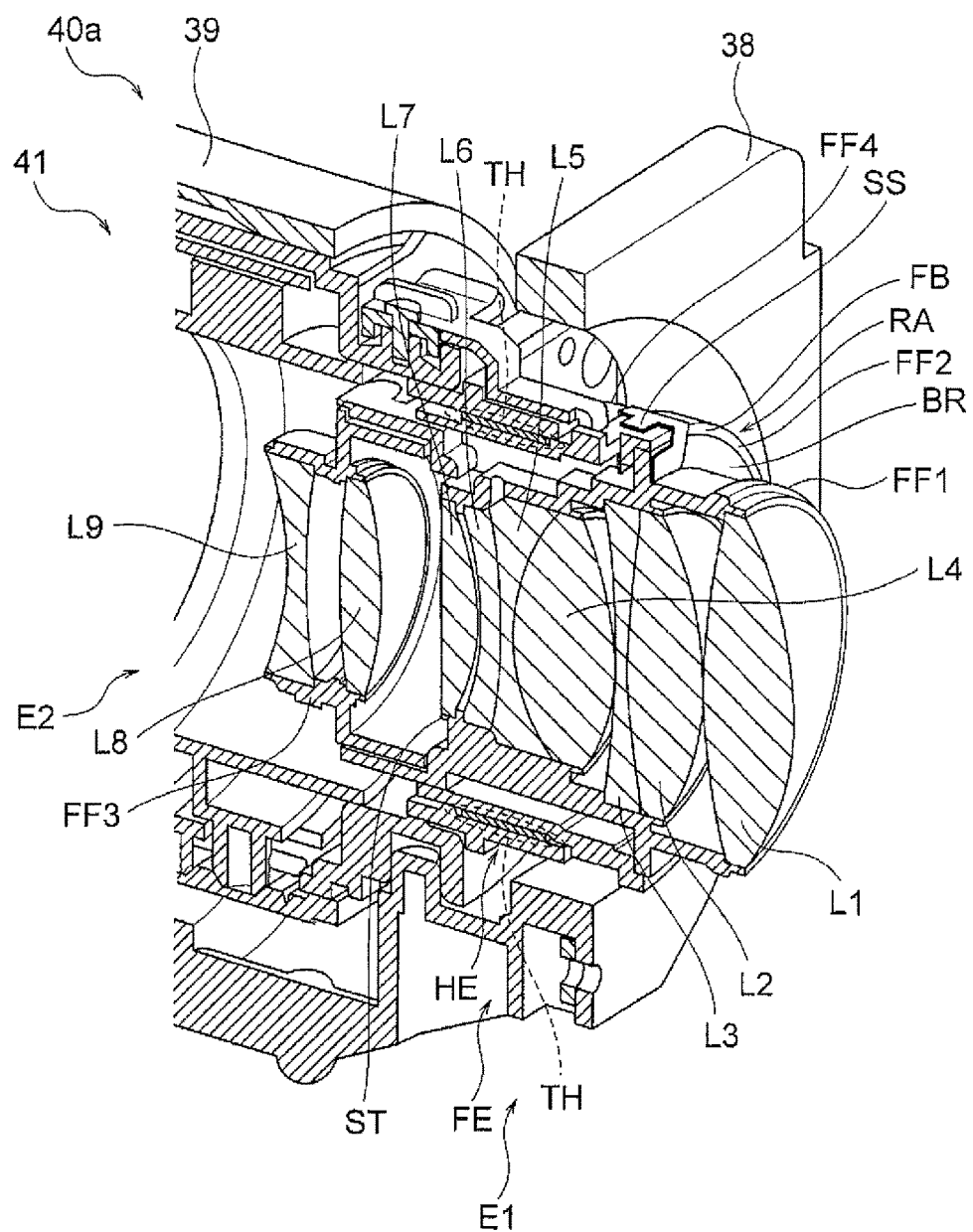
FIG. 3 is a perspective enlarged cross-sectional drawing of part of FIG. 2B.
Figure 4:
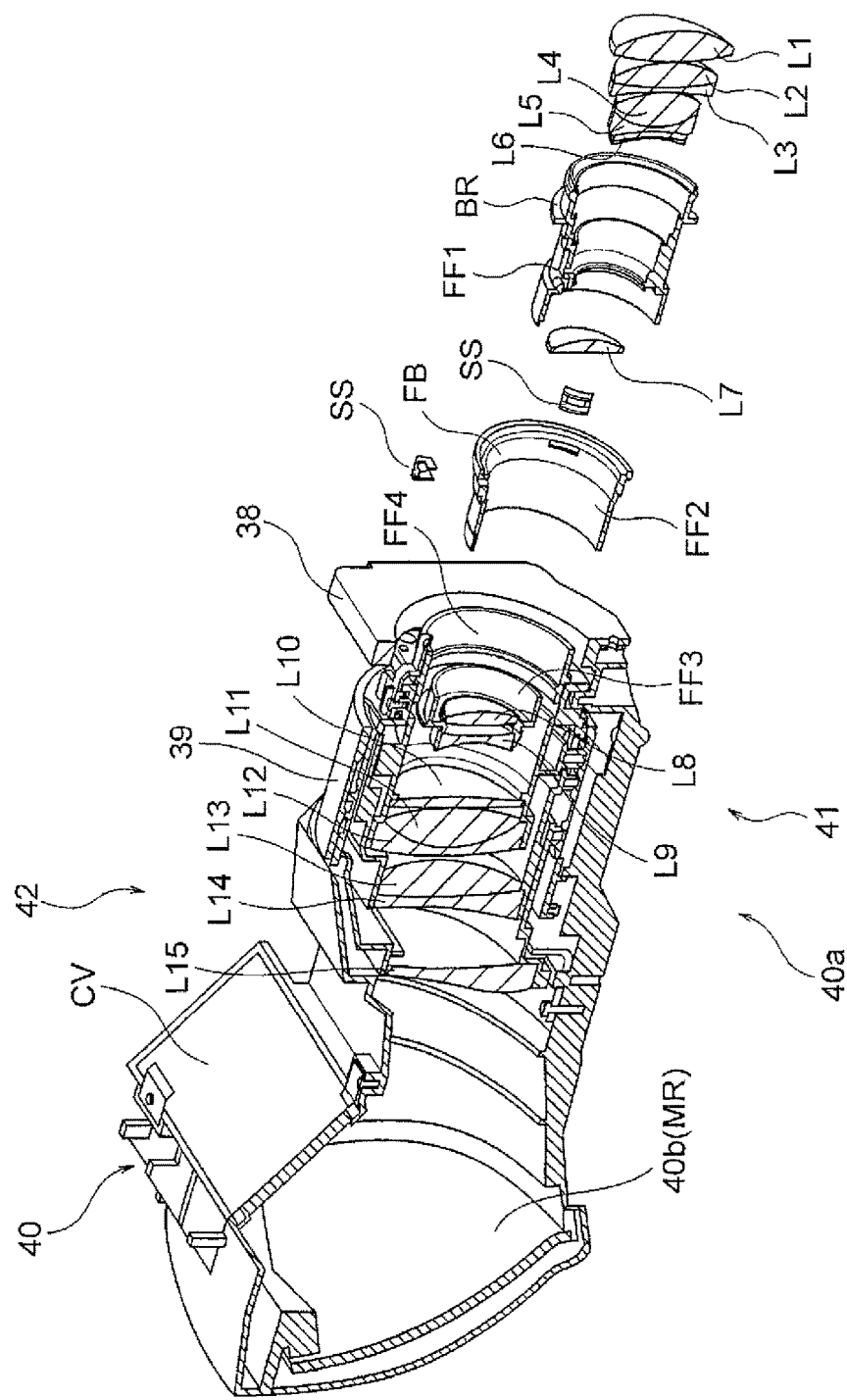
FIG. 4 is a perspective exploded cross-sectional drawing showing the projection system.

Further, a collar-shaped section BR, which extends in an in-plane direction perpendicular to the optical axis direction, is provided around the outer surface of the first frame FF1, and a plurality of spring pieces SS are attached to a flange section FB formed at an end surface of the second frame FF2, as shown, for example, in FIG. 3. In the process of manufacturing the first-first lens group 41 and the process of assembling the sections described above, the spring pieces SS sandwich the first frame FF1 and the second frame FF2 and function as an biasing member (elastic member) that and applies biasing force acting toward the second frame FF2 to the collar-shaped section BR of the first frame FF1. The first frame FF1 is thus reliably fit into the second frame FF2. The spring pieces SS further maintain a state in which the first frame FF1 is so combined with the second frame FF2 as to be allowed only to rotate with the first frame FF1 being in contact with and pressed against the second frame FF2. In other words, providing the fitting structure between the first frame FF1 and the second frame FF2 not only ensures the rotating action of the first frame FF1 relative to the second frame FF2 in the process of positioning of the lenses that form the first-first lens group 41 but also forms a rotation angle adjustment mechanism RA, which adjusts the rotation angle of at least part of the first-first lens group 41, which is the reduction side lens group. The rotation angle adjustment mechanism RA described above, which formed of the first frame FF1 and the second frame FF2, allows adjustment of the rotation angle with the distance between the first-first lens group 41 and the object plane maintained irrespective of back focus adjustment, which will be described later, and therefore allows centering of the optical system. The third frame FF3, which accommodates the lens group E2 (lenses L18 and L9) has a structure that allows the third frame FF3 to be centered relative to the first frame FF1 and fit therein. The third frame FF3 is fit into the first frame FF1 and then bonded and fixed to the first frame FF1, whereby the third frame FF3 is rotatable integrally with the first frame FF1 after the bonding. Therefore, in this case, the lenses L1 to L9 as a whole, which form the first-first lens group 41, form an integral part. The rotation angle adjustment mechanism RA described above maintains the first frame FF1 rotatable relative to the second frame FF2 when the lens groups are assembled and fixed.

On the other hand, the second frame FF2 and the fourth frame FF4 have a screw structure TH formed of male and female screws corresponding to each other and provided on the outer surface of the second frame FF2 and the inner surface of the fourth frame FF4, which are the surfaces where the second frame FF2 and the fourth frame FF4 are in contact with each other. The helicoid structure HE, which allows rotary feeding action, is thus formed. That is, the second frame FF2 and the fourth frame FF4 form a feeding structure FE, which adjusts, through the rotary feeding operation, the distance between the entire first-first lens group 41, which is the reduction side lens group, and the object plane, whereby the back focus adjustment can be performed. In other words, since the feeding mechanism FE described above, which is formed of the second frame FF2 and the fourth frame FF4, is provided, the second frame FF2 can be moved and fed along the screws of the screw structure TH. As a result, the first-first lens group 41 moves along the optical axis direction for the back focus adjustment. In this case, the rotation angle adjustment mechanism RA can rotate the first-first lens group 41 independent of the rotating action of the first-first lens group 41 performed by the helicoid structure HE of the feeding mechanism FE. That is, the rotation angle adjustment mechanism RA can adjust the rotation angle with the distance between the lens group E1, which is accommodated in the first frame FF1, and the object plane maintained.

As described above, the second frame FF2 and the fourth frame FF4 form the feeding mechanism FE, and the first frame FF1 and the second frame FF2 form the rotation angle adjustment mechanism RA, with the rotating action of the feeding mechanism FE and the rotating action of the rotation angle adjustment mechanism RA performed independent of each other. The back focus adjustment and the centering can therefore be readily performed.

Among the steps of manufacturing the projection system 40 having the configuration described above, an example of the step of manufacturing the first-first lens group 41 (fixed lens group) will be described below. First, the lens group E1 is accommodated in the frame FF1, and the lens group E2 is accommodated in the frame FF3. The frames FF1 to FF4 are then combined with one another. The back focus adjustment is then performed by using the rotary feeding action of the feeding mechanism FE to achieve an optimum back focal distance, followed by positioning. That is, the amount of feeding of the second frame FF2 fed relative to the fourth frame FF4 is determined, and the second frame FF2 is bonded or otherwise fixed. The first-first lens group 41 is then centered by using the rotating action of the rotation angle adjustment mechanism RA with the distance between the lens group E1 and the object plane maintained, whereby the first-first lens group 41 is positioned at an optimum rotation angle. That is, the rotation angle of the first frame FF1 (accompanying third frame FF3) rotated relative to the second frame FF2 is determined, and the first frame FF1 is bonded or otherwise fixed. In this process, since the rotation angle adjustment mechanism RA adjusts the rotation angle with the distance between the lens group E1 and the object plane maintained as described above, the action of the rotation angle adjustment mechanism RA does not affect the back focus adjustment having been already performed. The first-first lens group 41 is thus configured with the back focus adjustment and the centering optimized. In this case, for example, the rotation angle adjustment mechanism RA is fixed to the feeding mechanism FE by using a fixing member (bonding section) formed of a curable adhesive applied to maintain the rotation angle of the first frame FF1 relative to the second frame FF2. The bonding and fixing operation described above prevents deterioration of the relative positional relationship after the bonding operation.

Although not described in detail, the lens barrel section 39 has a plurality of cylindrical frame structures (frames) for accommodating the lenses that form the first-second lens group 42, which is a movable lens group that can move in the focusing operation, in such a way that the plurality of frame structures accommodate the respective lens groups that move independent of one another in the focusing operation. Therefore, in the focusing operation, an actuator or any other component moves the lens groups on a frame basis along the optical axis. To move the lens groups (that frames), a variety of movement aspects are conceivable depending on how to perform the focusing operation. For example, a cam mechanism may be used to move the independently moving lens groups in a synchronous manner.

In general, in a projection system that performs wide-angle projection over a short distance (short-throw projection) (see FIG. 7), since the screen-side image plane tends to be greatly inclined due to variation in the back focal distance (distance from panel surface to rear lens), it is necessary to precisely adjust the back focal length at least in the process of manufacturing the projection system. To this end, in general, in the step of manufacturing the projection system, a fixed lens group that is one of the lens groups that form the projection system and disposed on the reduction side is configured to be movable forward and rearward while rotated, for example, with the aid of a helicoid screw for adjustment of the dimension between the panel surface and a rear lens on the side where the highest demagnification is achieved. In this case, however, since both the back focus adjustment and the centering are performed by rotation, sharing a rotation mechanism for the centering with a back focus mechanism undesirably changes the back focus when the centering is performed. It is therefore not easy to reliably perform both the back focus adjustment and the centering. In contrast, the present embodiment, in which the feeding mechanism FE and the rotation angle adjustment mechanism RA described above are provided, allows the back focus adjustment and the centering to be readily performed.

Figure 5:
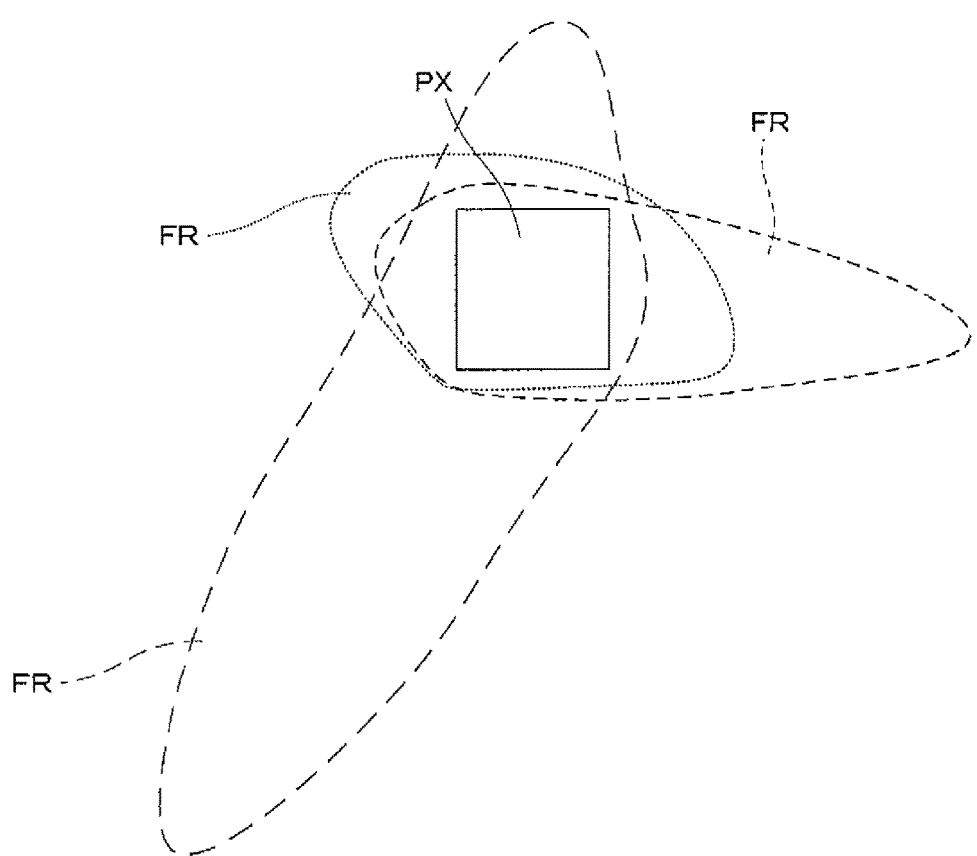
FIG. 5 conceptually shows produced flare.

FIG. 5 conceptually shows, on a pixel PX basis (pixel displayed on screen, for example), flare produced due to a decentered lens. In a case where lenses are arranged as designed or in a case close thereto, no flare on a pixel PX basis, such as that shown in FIG. 5, is produced, or the amount of flare is small even when the flare is produced. In practice, however, flare FR having a variety of shapes, such as those shown in FIG. 5, is likely to be produced depending on the amount of positional deviation of the lenses due, for example, to a manufacturing error from a design position and how the positional deviation occurs. In particular, when an aspheric lens is used, the centering is very important work because the decentered aspheric lens greatly degrades optical performance. In the present embodiment, the rotating action of the first-first lens group 41 performed by the rotation angle adjustment mechanism RA is performed independent of the rotating action for the back focus adjustment performed by the feeding mechanism FE to prevent degradation in the performance of a lens group including an aspheric lens (lens L6).

Figure 6:
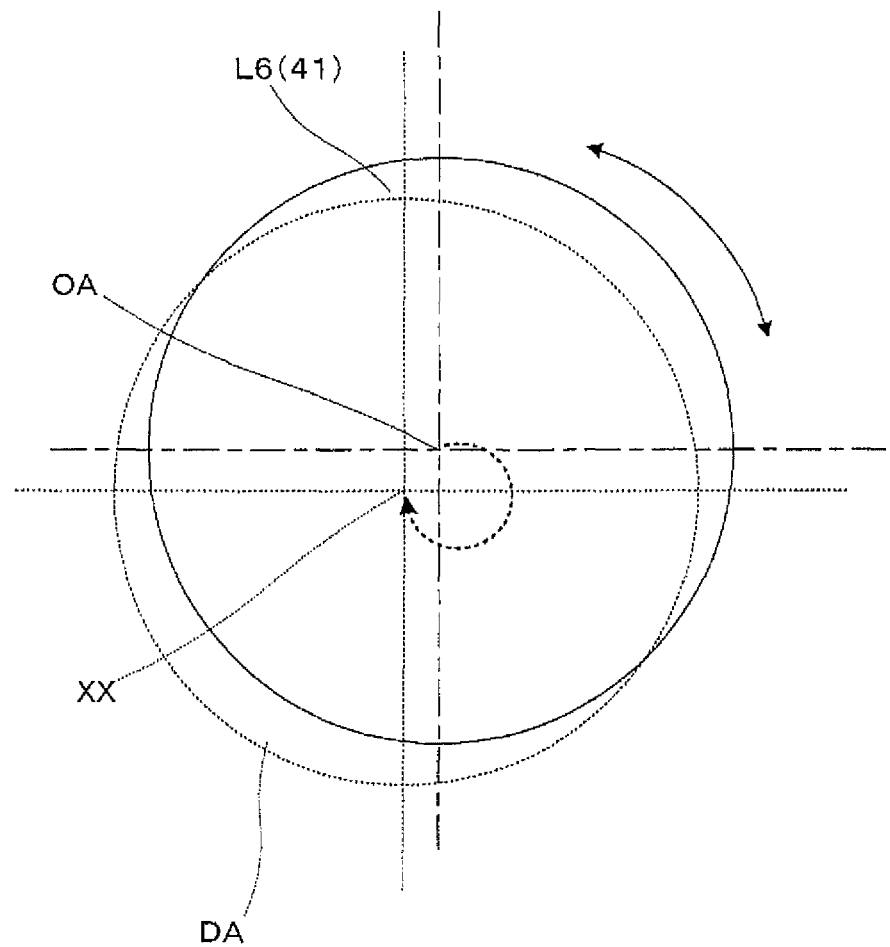
FIG. 6 is a conceptual drawing for describing the action of a rotation angle adjustment mechanism.

FIG. 6 is a conceptual drawing for describing the action of the rotation angle adjustment mechanism RA (see FIG. 3 and other figures). The circle drawn with the solid line represents an actual position of a lens group rotated by the rotation angle adjustment mechanism RA (for example, first-first lens group 41 including lens L6). The circle drawn with the dotted line represents a lens position DA intended in optical design (ideal position). The intersection point XX represents the position of the optical axis intended in optical design. When the position of the optical axis OA of the first-first lens group 41 is centered by the rotating action and therefore approaches the intersection point XX as shown in FIG. 6, the amount of flare FR, such as that shown in FIG. 5 by way of example, is reduced, whereby the performance of the projection system 40 and hence the performance of the projector 2 can be increased.

As described above, in the projection system 40 according to the present embodiment, the feeding mechanism FE can adjust the distance between the first-first lens group 41, which is the reduction side lens group, and the panel surface of the liquid crystal panel 18G (18R, 18B), which is the object surface, for the back focus adjustment. Further, the rotation angle adjustment mechanism RA, which is capable of rotating action independent of the rotating action performed in the back focus adjustment, can adjust the rotation angle of the lenses L1 to L9, which form the first-first lens group 41. That is, both the back focus adjustment and the centering can be readily performed, which improves the yield of the projection system and prevents degradation in the optical performance thereof due to assembling operation.

In the above description, in the manufacturing process, the frames FF1 and FF2 are bonded and fixed to each other after the first-first lens group 41, which is the fixed lens group, is adjusted. The present embodiment is, however, not limited to the case described above. The first-first lens group 41 may be configured to be adjustable again after the projector is manufactured (after the projection system starts being used as the optical system incorporated in the projector or any other apparatus). That is, after the back focus adjustment and the centering are performed, the frames FF1 and FF2 are not bonded or fixed to each other, but the frames FF1 and FF2 may be maintained in a state in which they are rotatable with the positions thereof fixed by using an elastic member, such as an biasing member. In this case, the centering can be performed again.

Further, in the above description, in the double frame structure including the first frame FF1 and the second frame FF2, which is fit into the first frame FF1, the feeding mechanism FE is provided in a relatively outer position, and the rotation angle adjustment mechanism RA is provided in a relatively inner position. In contrast to the configuration described above, for example, the feeding mechanism FE may be provided in a relatively inner position, and the rotation angle adjustment mechanism RA may be provided in a relatively outer position. Specifically, for example, a screw structure may be provided between the outer surface of the first frame FF1 and the inner surface of the second frame FF2 to form a feeding mechanism, and a fitting mechanism that adjusts the rotation angle with the distance between the lens group E1 and the object plane maintained may be provided around the outer surface of the second frame FF2 to form a rotation angle adjustment mechanism.

Example

An example of the projection system 40 will be specifically described below with reference to FIGS. 7 and 8. It is noted that the example corresponds to the embodiment described above.

Figure 7:
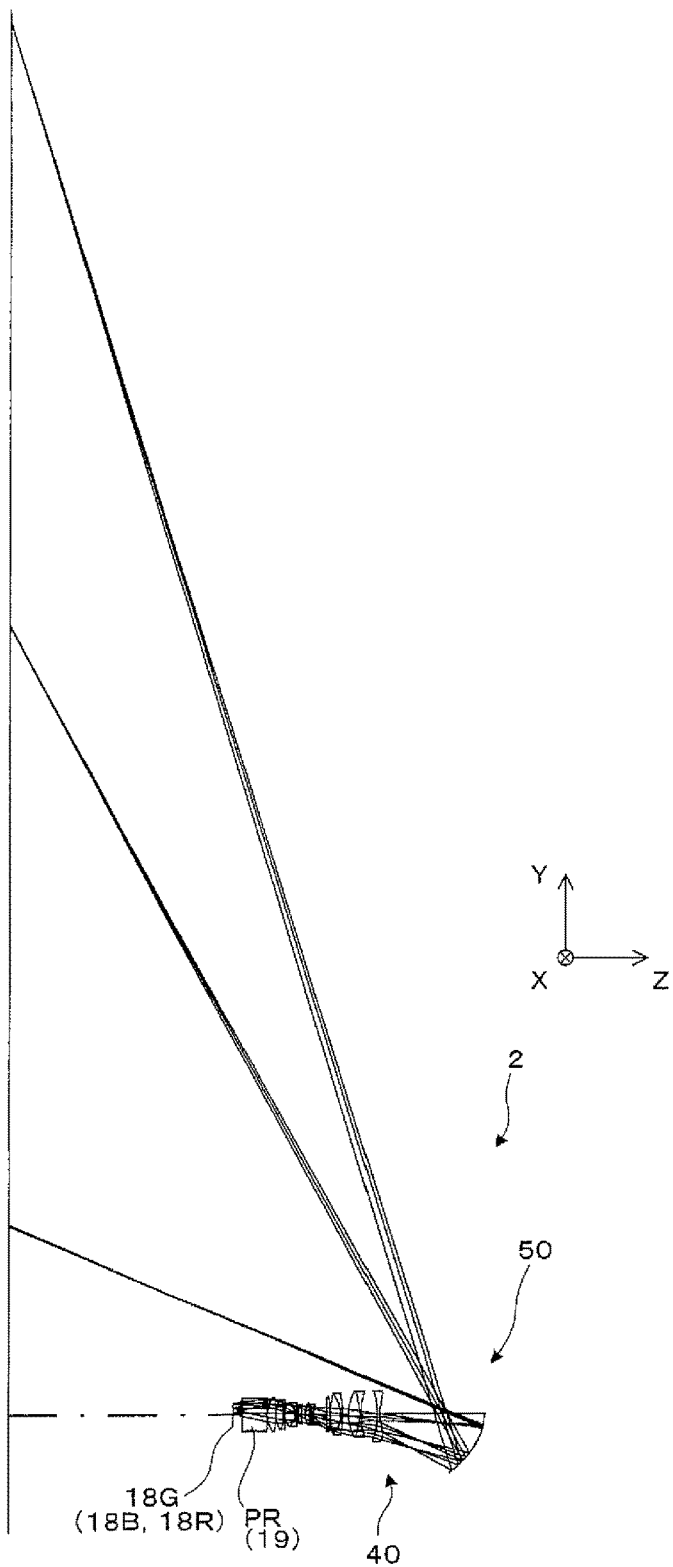
FIG. 7 shows the configuration from the object plane in a projection system according to an example to a projection surface and is a light ray diagram in the configuration.
Figure 8:
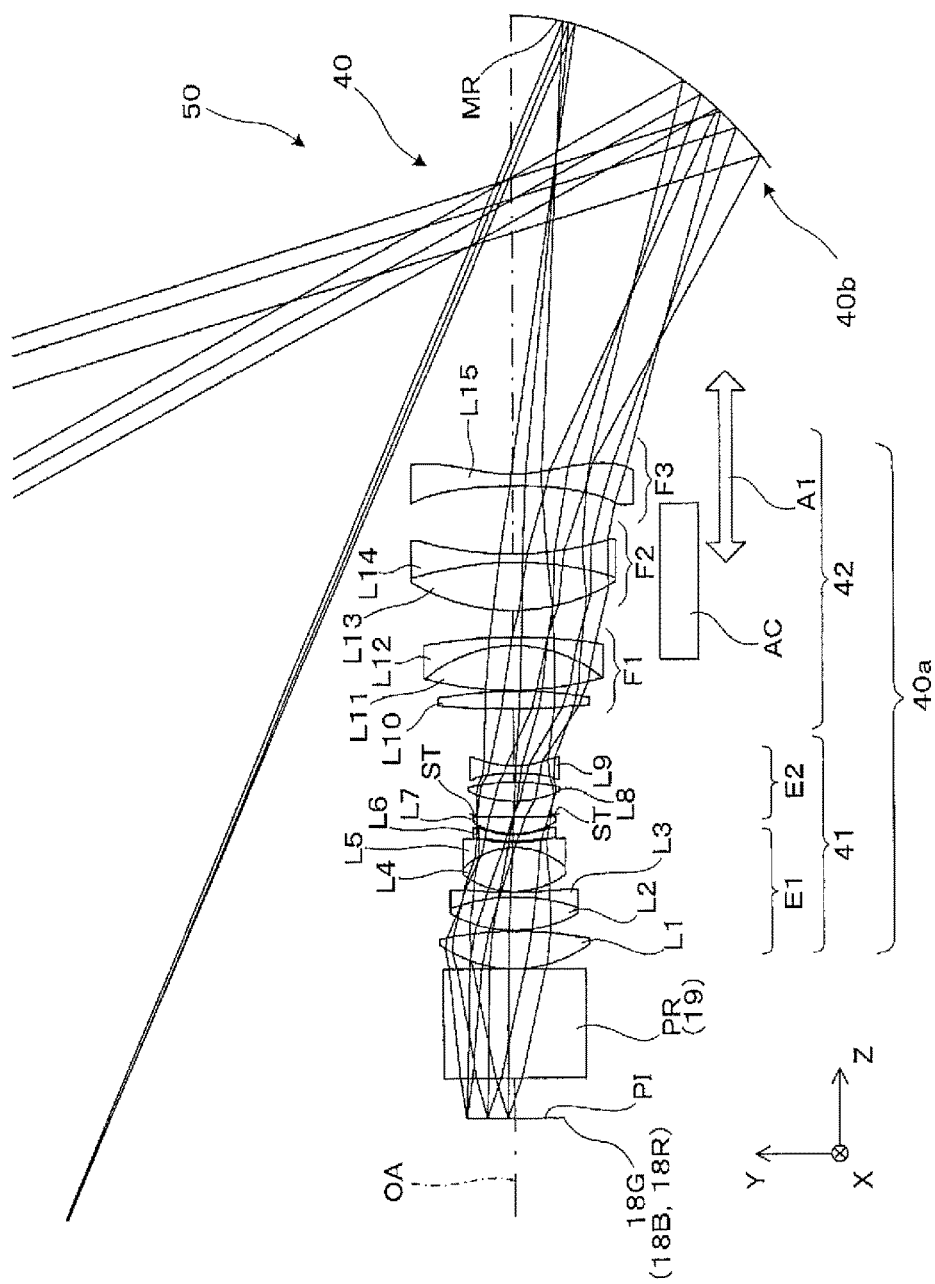
FIG. 8 is a partial enlarged drawing of a portion in FIG. 7 from the object plane to a concave reflection mirror.

The projection system 40 according to the example shown in FIGS. 7 and 8 projects an image formed on the display area of the liquid crystal panel 18G (18R, 18B) on the screen that is not shown. A prism PR corresponding to the cross dichroic prism 19 shown in FIG. 1 is disposed between the projection system 40 and the liquid crystal panel 18G (18R, 18B).

The projection system 40 is formed of the first-first lens group 41 and the first-second lens group 42, which form the first optical group 40a, and the second optical group 40b sequentially arranged from the reduction side. The first-first lens group 41 is formed of the lens group E1 (lenses L1 to L7), which is shifted from the aperture stop ST toward the reduction side, and the lens group E2 (lenses L8 and L9), which is shifted from the aperture stop ST toward the enlargement side. The lens L6 is an aspheric lens made of glass, and each of the other lenses is a spherical lens made of glass. The lens L2, which is a positive lens, and the lens L3, which is a negative lens, form a doublet, and the lenses L4 and L5 form a doublet.

The first-second lens group 42 has the following three lens groups sequentially arranged from the reduction side: a positive first movable lens group F1, which is formed of three lenses (lenses L10 to L12); a second movable lens group F2, which is formed of two lenses (lenses L13 and L14); and a third movable lens group F3, which is formed of one negative lens (lens L15). The lens groups F1 to F3 are accommodated in a plurality of respective frames of the lens barrel section. In the focusing operation, the actuator AC moves the frames independent thereof on a frame basis in the direction A1 along the optical axis. The lens L15 is a resin lens (aspheric lens) having negative power and having aspheric surfaces on opposite sides. The lens L15, which is originally a circular aspheric lens, has a shape with a portion where no light beam passes cut off. The lenses L13 and L14, which form the second movable lens group F2, form a cemented glass lens. Each of the lenses L13 and L14 has a shape with an upper portion of the lens cut off so that the lens does not truncate the light having exited out of the second optical group 40b, which is formed of the mirror. That is, each of the lenses L13 to L15, which originally has a circular shape symmetric about the optical axis OA, has a shape with part of an upper portion (portion on which image light is projected) of the circular shape removed. Each of the lenses L10 to L13, which are the lenses other than the lenses described above, is a spherical lens made of glass and has a circular shape symmetric about the optical axis OA.

The second optical group 40b is formed of the mirror MR, which has a single concave aspheric surface, and the mirror MR reflects the image light having exited out of the first optical group 40a toward the screen.

The meanings of a variety of parameters in the present example are summarized below.

f: Focal length of overall system

ω: Half field angle

NA: Numerical aperture

R: Radius of curvature

D: On-axis inter-surface space (thickness of lens or space between lenses)

Nd: Refractive index at d line

Vd: Abbe number at d line

An aspheric surface is identified by the following polynomial (expression of aspheric surface).

$$z = \frac{ch^2}{1+\sqrt{1-(k+1)c^2h^2}} + A_4h^4 + A_6h^6 + A_8h^8 + A_{10}h^{10} + A_{12}h^{12} + A_{14}h^{14}$$

where c: Curvature (1/R)

h: Height from optical axis k: Conic coefficient of aspheric surface

Ai: Higher-order aspheric coefficient of aspheric surface

Table 1 shown below shows data on the lens surfaces in the example described above. In Table 1, OBJ stands for a panel surface PI, and STO stands for the aperture stop ST. A surface labeled with a surface number followed by "*" is a surface having an aspheric shape.

TABLE 1 f 3.753
ω 72.7
NA 0.313

|  | R | D | Nd | Vd |
|---|---|---|---|---|
| OBJ | Infinity | 9.500 | | |
| 1 | Infinity | 25.970 | 1.51633 | 64.14 |
| 2 | Infinity | 0.000 | | |
| 3 | 29.749 | 9.200 | 1.61800 | 63.33 |
| 4 | −90.854 | 0.200 | | |
| 5 | 31.147 | 8.000 | 1.49700 | 81.54 |
| 6 | −46.319 | 1.200 | 1.80518 | 25.42 |
| 7 | 115.301 | 0.200 | | |
| 8 | 21.01 | 10.500 | 1.48749 | 70.24 |
| 9 | −18.367 | 1.200 | 1.90366 | 31.31 |
| 10 | 40.142 | 0.400 | | |
| *11 | 22.722 | 1.400 | 1.58913 | 61.15 |
| *12 | 14.117 | 0.300 | | |
| 13 | 19.166 | 4.000 | 1.48749 | 70.24 |
| 14 | 223.258 | 0.671 | | |
| STO | Infinity | 3.142 | | |
| 16 | 26.258 | 4.600 | 1.84666 | 23.78 |
| 17 | −52.237 | 2.067 | | |
| *18 | −101.023 | 1.800 | 1.74320 | 49.29 |
| *19 | 20.505 | Variable space | | |
| 20 | 198.906 | 4.200 | 1.64769 | 33.79 |
| 21 | −105.554 | 0.200 | | |
| 22 | 82.236 | 10.800 | 1.62004 | 36.26 |
| 23 | −32.21 | 2.000 | 1.80518 | 25.42 |
| 24 | −127.875 | Variable space | | |
| 25 | 47.079 | 11.500 | 1.58144 | 40.75 |
| 26 | −83.369 | 2.000 | 1.80518 | 25.42 |
| 27 | 83.369 | Variable space | | |
| *28 | −146.264 | 2.800 | 1.53116 | 56.04 |
| *29 | 35.005 | Variable space | | |
| *30 | −54.303 | Variable space | Reflection surface | |
| 31 | Infinity | | | |

In Table 1 shown above and the tables shown below, 10 raised to some power (1.00×10$^{+18}$, for example) is expressed by using E (1.00E+18, for example).

Table 2 shown below shows aspheric coefficients of the lens surfaces in the example.

TABLE 2

| | | | Aspheric coefficients | | | | |
|---|---|---|---|---|---|---|---|
| | K | A04 | A06 | A08 | A10 | A12 | A14 |
| 11 | −1.4162 | −3.1275E−04 | 2.1480E−06 | −4.7918E−09 | 0.0000E+00 | 0.0000E+00 | 0.0000E+00 |
| 12 | −1.9911 | −2.5613E−04 | 2.3305E−06 | −9.6210E−09 | 1.5979E−11 | 0.0000E+00 | 0.0000E+00 |
| 18 | −1.0000 | −8.9299E−05 | 0.0000E+00 | 0.0000E+00 | 0.0000E+00 | 0.0000E+00 | 0.0000E+00 |
| 19 | 0.6743 | −7.5262E−05 | 1.0469E−07 | −5.4544E−10 | 0.0000E+00 | 0.0000E+00 | 0.0000E+00 |
| 28 | −104.8836 | −1.3716E−05 | 2.6918E−08 | −3.8636E−11 | 2.1555E−14 | −6.2068E−18 | 0.0000E+00 |
| 29 | 0.0000 | −3.3687E−05 | 4.9222E−08 | −7.9903E−11 | 7.8149E−14 | −4.7186E−17 | 1.2130E−20 |
| 30 | −0.9865 | 5.6413E−08 | 3.8062E−11 | −5.3064E−14 | 1.7923E−17 | −3.1309E−21 | 2.1598E−25 |

The Table 3 shown below shows the values of the variable spaces 19, 24, 27, 29, and 30 in Table 2 at the following projection magnification: 125; 100; and 169.

TABLE 3

| | Variable space | | |
|---|---|---|---|
| | 125x | 100x | 169x |
| 19 | 13.506 | 13.945 | 13.203 |
| 24 | 6.445 | 4.000 | 8.916 |
| 27 | 16.200 | 17.836 | 14.500 |
| 29 | 110.000 | 110.369 | 109.532 |
| 30 | −501.000 | −409.990 | −666.138 |

The effect of a decentered lens that forms part of the projection system 40 described above on the optical performance will be described with reference to FIGS. 9A and 9B and other figures.

Figure 9A:
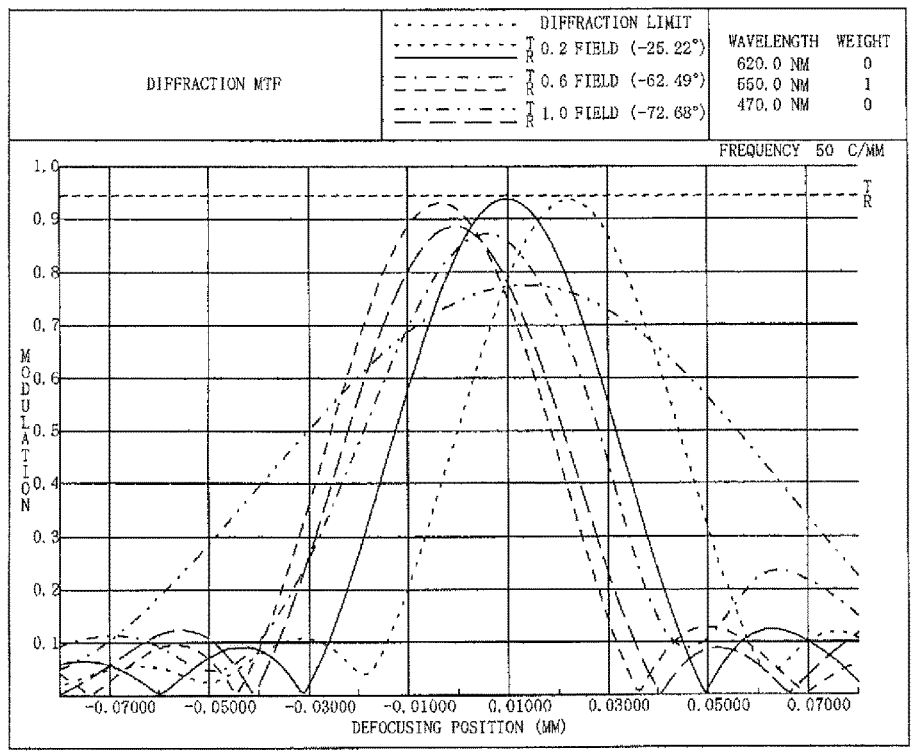
FIG. 9A shows graphs representing MTFs of the projection system with no decentered lens.
Figure 9B:
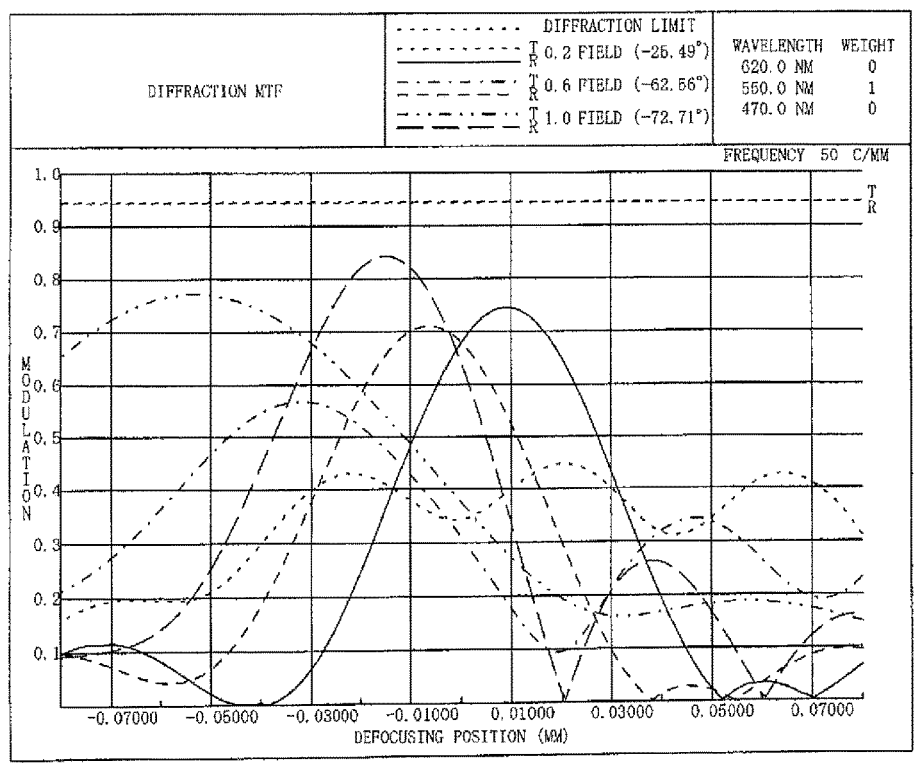
FIG. 9B shows graphs representing MTFs of the projection system with an aspheric lens decentered.

FIG. 9A shows graphs representing MTFs of the projection system 40 with no decentered lens. That is, FIG. 9A shows graphs illustrating the projection system 40 configured as intended in optical design. On the other hand, FIG. 93 shows graphs representing MTFs of the projection system 40 with an aspheric lens (L6) decentered by 20 μm from a design value. It can be said that FIG. 93 shows graphs representing MTFs corresponding to a state in which the position of the aspheric lens (lens L6) deviates from a design value so that flare, such as that described with reference to FIG. 5 and other figures, is produced. The horizontal axis of FIGS. 9A and 9B represents the amount of defocus, and the vertical axis represents the performance of the projection system 40 (resolution). In the description, the performance calculated at each image height and using light of a wavelength of 550 nm is shown by way of example. Comparison between FIGS. 9A and 9B shows that when the position of the aspheric lens (lens L6) deviates from the design value, the optical performance of the projection system 40 significantly lowers. In a numerical sense, in the state shown in FIG. 9A, MTFs showing at least 60% are still provided over the entire range of the image heights, whereas in the state shown in FIG. 9B, the peak positions of the MTFs lower, and the MTFs lower to 40% or lower over the entire range of the image heights.

Figure 10A:
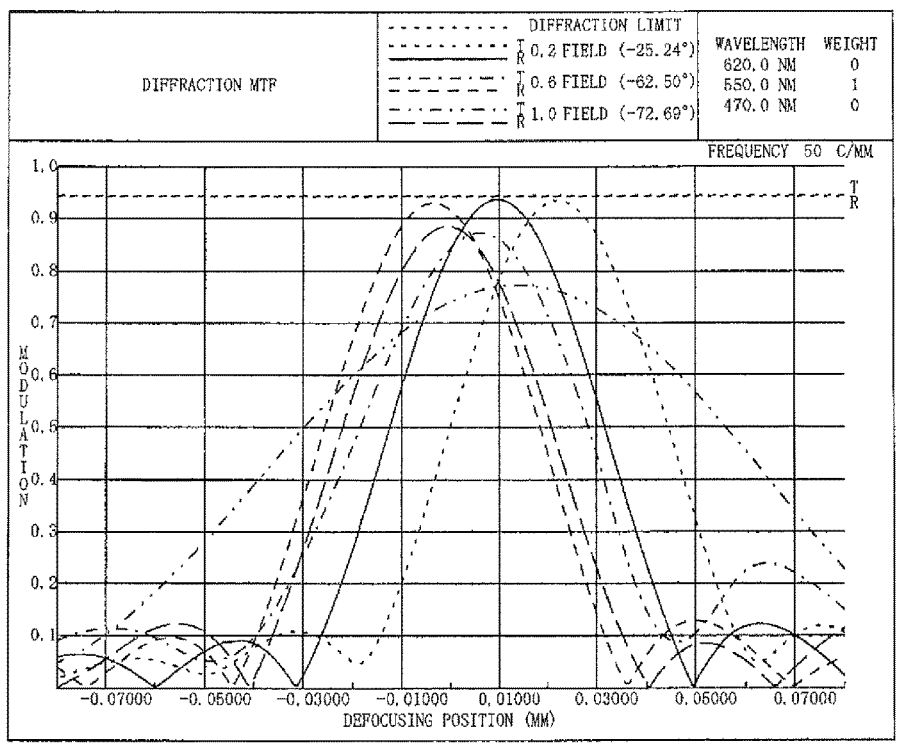
FIG. 10A shows graphs representing MTFs of the projection system with a spherical lens decentered.
Figure 10B:
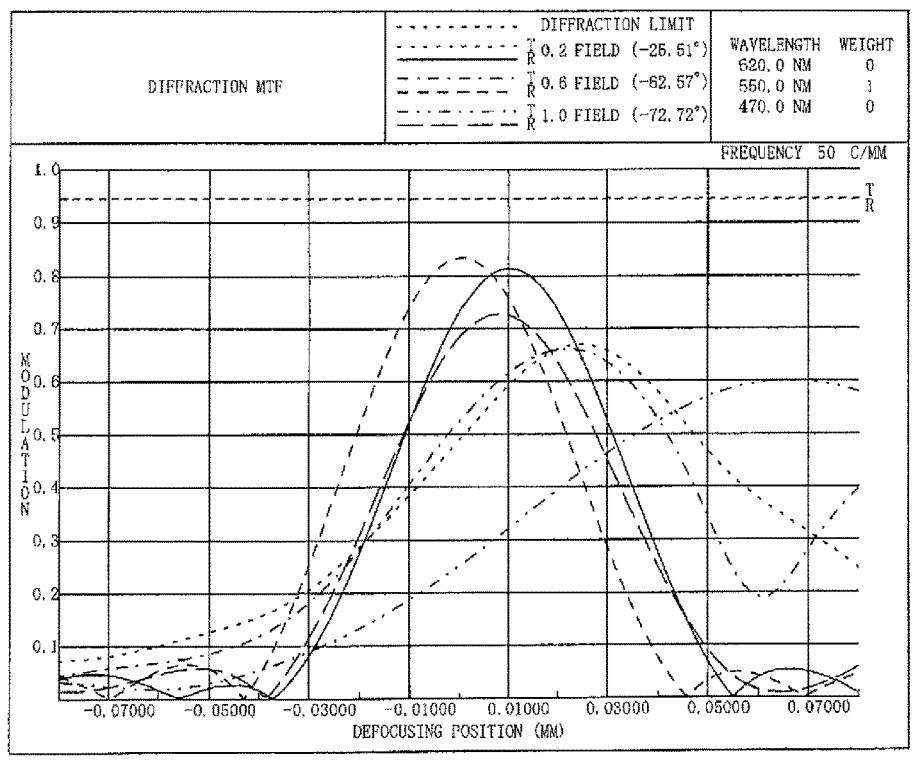
FIG. 10B shows graphs representing MTF of the projection system with a cemented lens decentered.

FIGS. 10A and 10B show another example. FIGS. 10A and 10B show graphs representing MTFs of the projection system 40 with a lens other than the aspheric lens (lens L6) decentered from a design value.

FIG. 10A shows graphs representing MTFs of the projection system 40 with the lens L7, which is a spherical lens, decentered by 20 μm from a design value. In this case, a decrease in MTF as large as the decrease shown in FIG. 9B is not observed. The result shows that it is important to center particularly the aspheric lens (lens L6) among the lenses that form the projection system 40.

FIG. 10B shows graphs representing MTFs of the projection system 40 with the lenses L4 and L5, which are spherical lenses and form a cemented lens, decentered by 20 μm from a design value. In this case, a decrease in the peak position of each of the MTFs and variation in the image plane are observed, but variation as large as that shown in FIG. 9B is not observed, as in the case described above. In the present embodiment, degradation in optical performance can be avoided by employing the rotation angle adjustment mechanism RA capable of centering the aspheric lens (lens L6) or the lens group containing the aspheric lens (lens L6).

The invention is not limited to the embodiment and example described above but can be implemented in a variety of other aspects to the extent that they do not depart from the substance of the invention.

Figure 11:
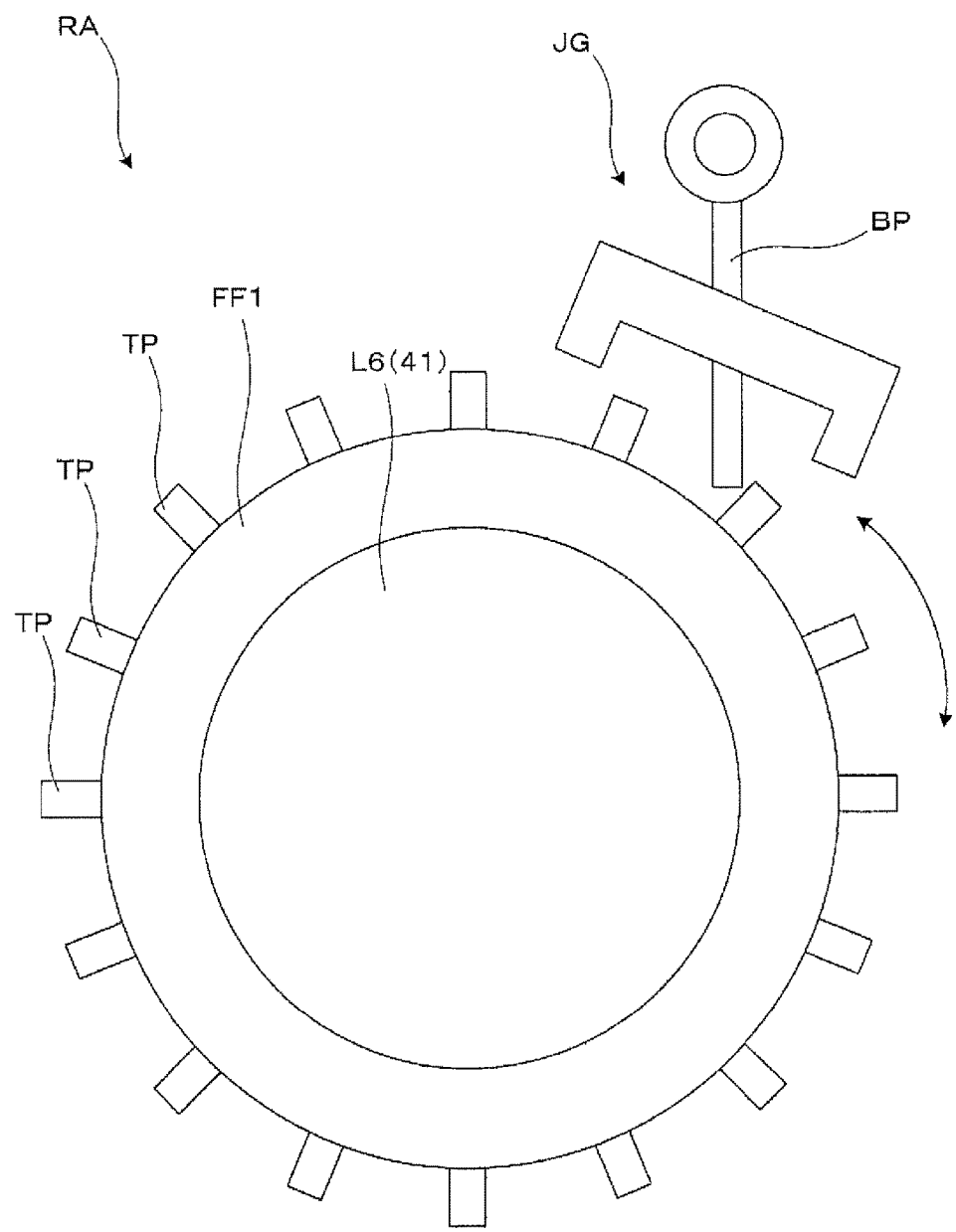
FIG. 11 is a conceptual drawing for describing a variation of the rotation angle adjustment mechanism.

In the above description, the rotating action of the rotation angle adjustment mechanism RA, that is, the rotation of a lens group can be achieved in a variety of aspects. For example, FIG. 11 conceptually shows a variation of the rotation angle adjustment mechanism RA. As shown in FIG. 11, the first frame FF1, which is a direct target to be rotated, may be provided with a plurality of gear-shaped protrusions TP (that is, protrusions and recesses), and a jig JG having a rod-shaped section BP for pressing the protrusions TP may be provided. According to the configuration described above, for example, even when a lens group is disposed at a location that cannot be directly accessed by a hand, the jig JG can be used to rotate the first frame FF1 to reliably perform the centering. It is noted that the double frame structure described above, in which one frame is fit into the other, may be partially provided with the protrusions and recesses described above.

Figure 12:
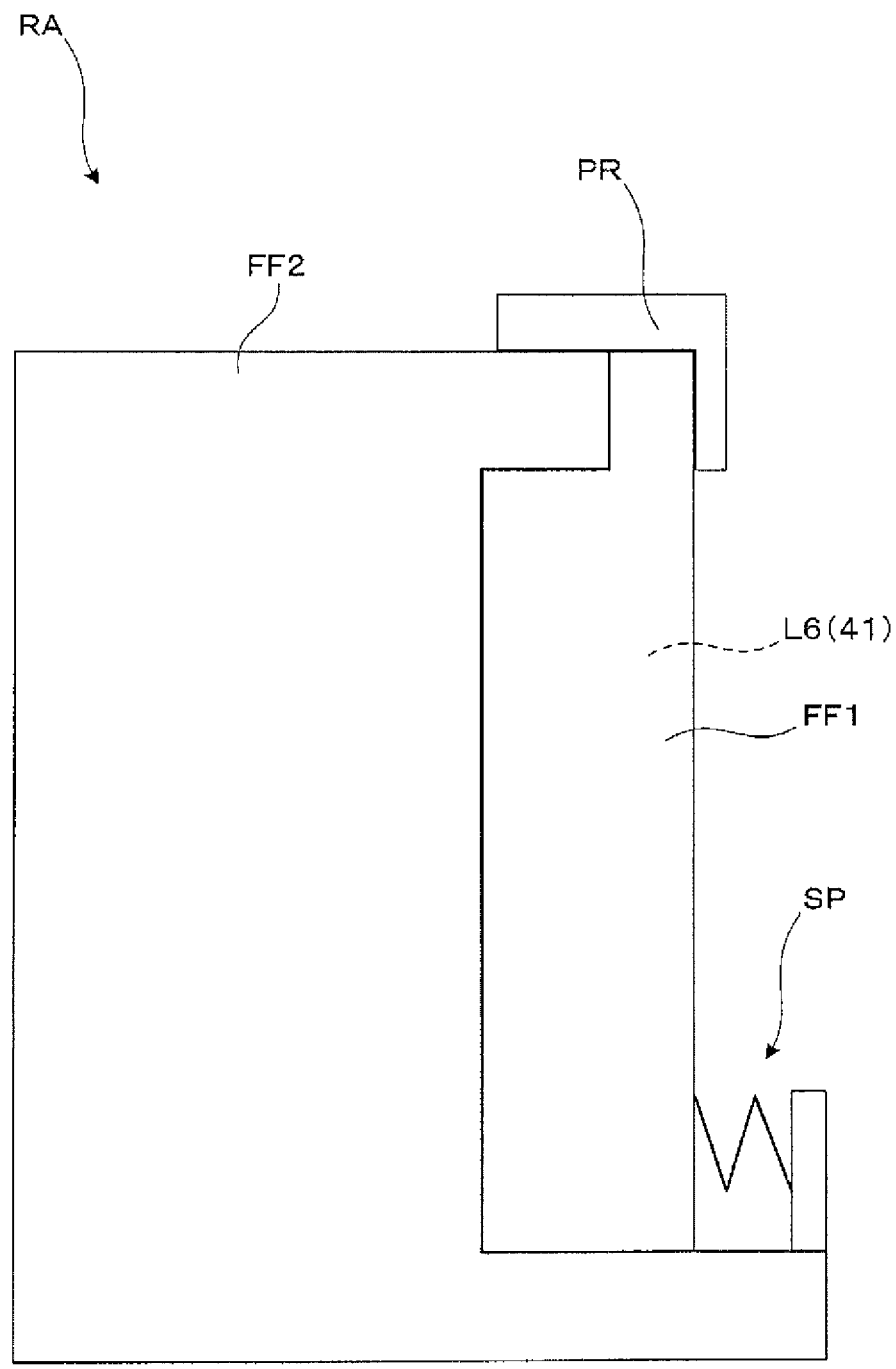
FIG. 12 is a conceptual drawing for describing another variation of the rotation angle adjustment mechanism.

As the configuration of the rotation angle adjustment mechanism RA, a variety of aspects can be employed as long as the rotating action is so maintained as to be independent of the rotating action of the feeding mechanism FE and the rotation angle can be adjusted with the distance between the lens group E1 and the object plane maintained. For example, as shown in FIG. 12, the first frame FF1, which accommodates the lens L6, may be pressed with a spring SP toward the second frame FF2 and held with an annular pressing ring PR along the edge of the first frame FF1.

Further, in the above description, the entire first-first lens group 41, which is the fixed lens group including the reduction side lens group, is rotated by the rotation angle adjustment mechanism RA. Instead, only part of the first-first lens group 41 may be rotated. For example, the rotation angle adjustment mechanism RA may rotate only the lens L6, which is an aspheric lens, or may rotate the lens L6 and a lens in the vicinity of the lens L6.

In the above description, the first-first lens group 41, which is the fixed lens group, is also the reduction side lens group provided in a position where the highest demagnification is achieved among the lens groups that form the projection system 40. For example, out of the lens groups E1 and E2, which form the first-first lens group 41, only the lens group E1, which is provided on the reduction side, may be considered as the reduction side lens group.

For example, in the example described above, at least one lens having substantially no power can be added in a position upstream or downstream of the lenses that form each of the lens groups or between any adjacent ones of the lenses that form each of the lens groups.

Further, image light formed by a variety of other light modulators, such as a digital micromirror device, may be enlarged and projected through the projection system 40.

The entire disclosure of Japanese Patent Application No. 2015-124488, filed Jun. 22, 2015 is expressly incorporated by reference herein.

What is claimed is:

1. A projection system comprising:
a reduction side lens group provided on a side where highest demagnification is achieved;
a feeding mechanism that performs rotary feeding action to adjust a distance between the reduction side lens group and an object plane; and
a rotation angle adjustment mechanism that is combined with the feeding mechanism and performs rotating action independent of the rotary feeding action to adjust a rotation angle by which at least part of the reduction side lens group is rotated.

2. The projection system according to claim 1, wherein the rotation angle adjustment mechanism adjusts the rotation angle with the distance between the reduction side lens group and the object plane maintained.

3. The projection system according to claim 1, further comprising the following components sequentially arranged from the reduction side: a fixed lens group including the reduction side lens group and fixed in an optical axis direction in focusing operation; a movable lens group allowed to move in the optical axis direction in the focusing operation; and an aspheric mirror having a reflection surface having a concave aspheric shape.

4. The projection system according to claim 1, wherein the reduction side lens group includes an aspheric lens, and
the rotation angle adjustment mechanism adjusts at least a rotation angle by which the aspheric lens is rotated.

5. The projection system according to claim 1, wherein the feeding mechanism and the rotation angle adjustment mechanism are configured by using a double frame structure including an outer frame and an inner frame for accommodating lenses.

6. The projection system according to claim 1, wherein the rotation angle adjustment mechanism is biased by an biasing member toward the feeding mechanism and rotatably combined with the feeding mechanism.

7. The projection system according to claim 6, wherein the biasing member is a spring piece attached to a flange section formed at a feeding-direction-side end surface of the feeding mechanism, and
the rotation angle adjustment mechanism is rotatably disposed while pressed with the spring piece toward the feeding mechanism.

8. The projection system according to claim 1, wherein the rotation angle adjustment mechanism is fixed to the feeding mechanism by using a fixing member.

9. A projector comprising:
a light modulator that modulates light from a light source to form image light; and
the projection system according to claim 1 that projects the image light from the light modulator.

10. A projector comprising:
a light modulator that modulates light from a light source to form image light; and
the projection system according to claim 2 that projects the image light from the light modulator.

11. A projector comprising:
a light modulator that modulates light from a light source to form image light; and
the projection system according to claim 3 that projects the image light from the light modulator.

12. A projector comprising:
a light modulator that modulates light from a light source to form image light; and
the projection system according to claim 4 that projects the image light from the light modulator.

13. A projector comprising:
a light modulator that modulates light from a light source to form image light; and
the projection system according to claim 5 that projects the image light from the light modulator.

14. A projector comprising:
a light modulator that modulates light from a light source to form image light; and
the projection system according to claim 6 that projects the image light from the light modulator.

15. A projector comprising:
a light modulator that modulates light from a light source to form image light; and
the projection system according to claim 7 that projects the image light from the light modulator.

16. A projector comprising:
a light modulator that modulates light from a light source to form image light; and
the projection system according to claim 8 that projects the image light from the light modulator.

* * * * *